US006223913B1

United States Patent
Mosher

(10) Patent No.: US 6,223,913 B1
(45) Date of Patent: May 1, 2001

(54) TRANSPORT RACKING SYSTEM

(76) Inventor: James Lewis Mosher, 173 Danialson Pike, Foster, RI (US) 02825

( * ) Notice: Subject to any disclaimer, the term of this patent is extended or adjusted under 35 U.S.C. 154(b) by 0 days.

(21) Appl. No.: 09/480,614

(22) Filed: Jan. 10, 2000

(51) Int. Cl.$^7$ ...................................... B60P 7/08
(52) U.S. Cl. ................ 211/85.8; 296/24.1; 211/191; 224/564; 224/543
(58) Field of Search ................. 211/85.8, 191, 211/187; 296/3, 24.1; 224/564, 543, 550, 551; 410/31, 32, 151

(56) References Cited

U.S. PATENT DOCUMENTS

| | | | |
|---|---|---|---|
| 4,545,710 | * | 10/1985 | Hepp ........................................ 410/32 |
| 5,306,064 | * | 4/1994 | Padovano et al. ................... 296/24.1 |
| 5,439,152 | * | 8/1995 | Campbell ............................. 296/3 X |
| 5,769,580 | * | 6/1998 | Purvis ................................... 410/151 |
| 5,848,711 | * | 12/1998 | Schmit ............................. 211/187 X |

FOREIGN PATENT DOCUMENTS

563608 * 11/1955 (IT) ...................................... 410/143

\* cited by examiner

*Primary Examiner*—Stephen T. Gordon
(74) *Attorney, Agent, or Firm*—John P. Halvonik

(57) ABSTRACT

A shelving system designed to fit within the confines of a transport vehicle and including side wall sections forming a vertical and horizontal framework. The vertical sections contain a series of bolt holes for bolting through of both angle shaped and pocket shaped supports. The bolt holes provide for incremental vertical adjustment of the position of both of these types of supports. The pocket shaped supports are used to support telescopically adjustable load support bars. The angle shaped supports are used to support planking that functions as a shelf for merchandise in the vehicle.

2 Claims, 4 Drawing Sheets

Figure 1:
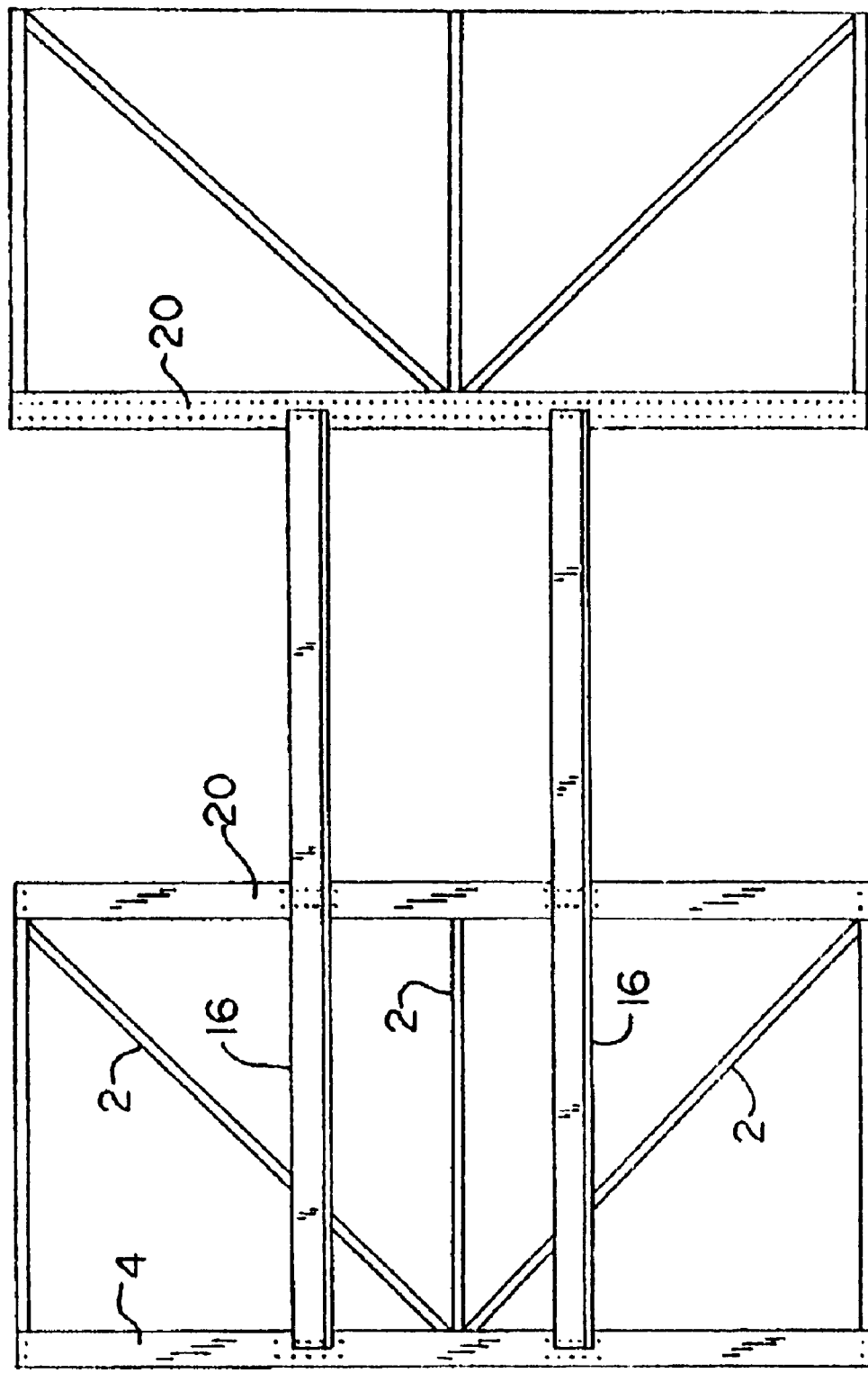

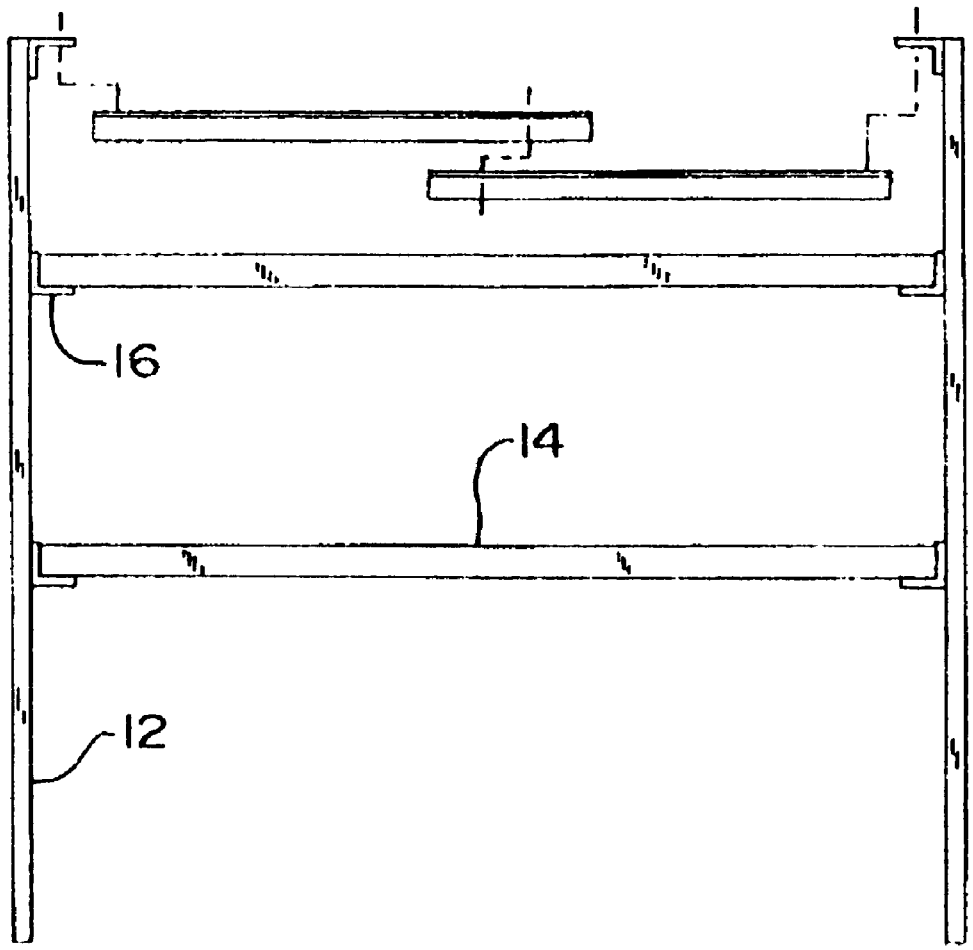
FIG. 4

TRANSPORT RACKING SYSTEM

FIELD OF THE INVENTION

The invention relates to the field of storage and shelving and in particular to a shelving system that is designed for implementation on vans that creates a space saving and time saving environment for the storage of various articles in vans and the like.

Whereas there have been shelving systems in use in vans for some time none of the prior art is known to use the concept of spring loaded tension devices also known as load bars" in order to support the various shelving units given the space available within the confines of the van or trailer.

The shelving units are specifically designed to accommodate merchandise that is stacked or otherwise transported in cargo vehicles, such as trailers and so by providing a shelving system within the vehicle this will enable greater storage of the products to be accomplished among other things.

SUMMARY OF THE INVENTION

The invention is a shelving system designed to fit within the confines of trailers and similar vehicles in order to allow merchandise to be racked on shelves in a space efficient and time saving manner. Side wall sections form a vertical and horizontal framework. The vertical sections contain a series of bolt holes for the bolting through of both angle shaped and pocket shaped supports. The bolt holes provide for incremental vertical adjustment of the position of both of these types of supports.

The pocket shaped supports are used to support load support bars that run across the width of the trailer or van and usually connected at the top and the bottom of each side section. The load bars are varied in pressure by ratcheting means or similar means when the system in place and provide lateral stability to the overall system. The angle shaped supports are used to support planking or other type of lateral support that functions as a shelf for the merchandise in the vehicle.

It is an object of the invention to provide a shelving system for set up with in trailers and other cargo vehicles that can be easily installed and broken down as need be.

Another object is to provide a transport racking system that can be alternatively constructed as a fixed in place design using welds or as an adjustable system using adjusting. . .

Another object is to provide a shelving system for cargo vehicles with shelving systems that are not permanent so that cargo vehicles in seasonal industries such as the nursery business will not be tied up with fixed shelving for those periods when the business is dormant.

Another object is to provide a support structure for cargo vehicles that can be easily taken apart and broken down and/or easily set up.

Another object is to provide a shelving structure for cargo vehicles that is fully adjustable in terms of vertical adjustment of both the shelf units and the load support bars that give the system lateral stability.

Other objectives will be known to those skilled in the art once the invention is shown and described.

Figure 2:
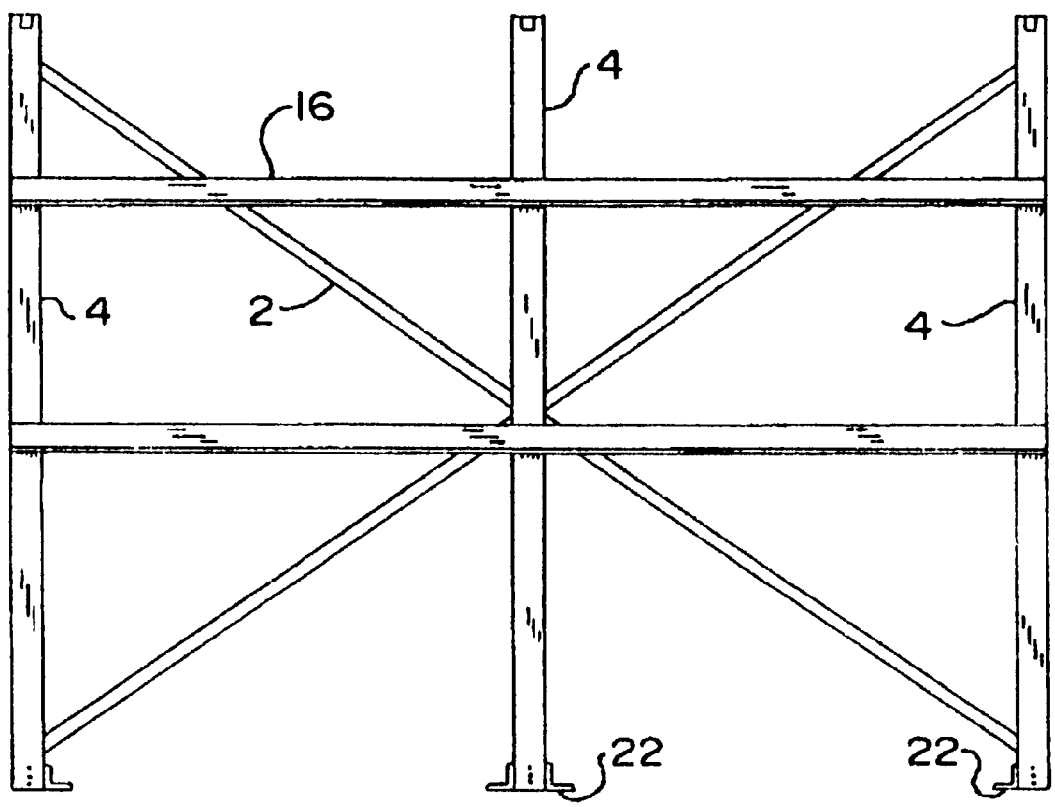
Figure 7:
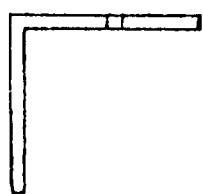
Figure 6:
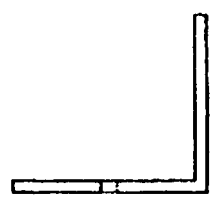
Figure 3:
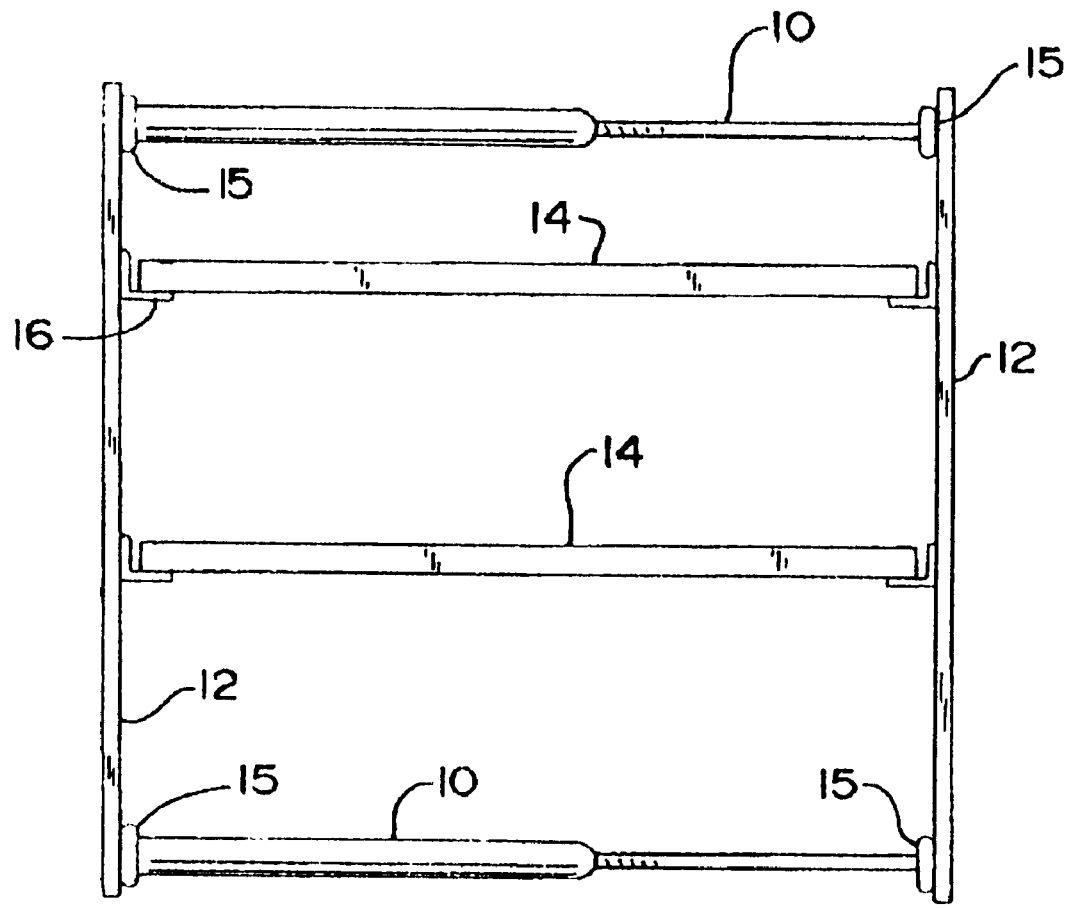
Figure 5A:
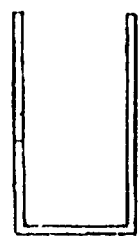
Figure 5B:
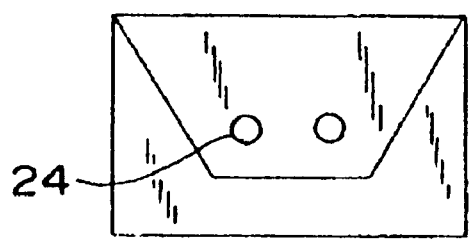

FIG. 1 view of sides of structure, showing side wall structure and shelf supports;

FIG. 2 another view of the sides;

FIG. 3 front view showing load bars and shelving;

FIG. 4 another front view;

FIG. 5 Detail of load bar pocket;

FIG. 6 and 7 angle clips used on top and bottom of walls.

DESCRIPTION OF THE PREFERRED EMBODIMENT

The overall system may be described as having side wall sections, (item 12 in FIG. 3; formed by items 2, 4 and 16 in FIGS. 1 and 2) that form a vertical and horizontal framework. The vertical sections 4 contain a series of holes 20 for the bolting through of both angle shaped 16 and pocket shaped 15 supports. The bolt holes provide for incremental vertical adjustment of the position of both of these types of supports (angled shaped and pocket shaped). The pocket shaped supports are used to support the load support bars 10 that run across the width of the trailer or van and are connected at the top and bottom of each side section. The angle shaped supports 16 are used to support planing or other type of lateral support that functions as a shelf 14.

The system is designed to be installed inside cargo vehicles with the left and right side frame sections 12 installed first. Upright pockets 15 are first installed into the tops and bottoms of each vertical support in preparation for the load bars 10. The pockets may be positioned via the series of bolt holes 20 in the vertical sections so that the height of the pockets can be made to conform to situation prevailing in the cargo vehicle.

Then, load bars 10 are installed at the tops of each side sections so as to connect the left and right sections to one another through the load supports. Next, angle shaped sections 16 are installed via bolts in the vertical sections. The height of these angled pieces is again chosen so as to conform to the specific conditions in the trailer. Their height may of course be varied by means of the holes in order to fit the type of item being carried in the vehicle.

Shelving units in the form of wooden planks 14 or other sturdy materials suitable for holding the cargo are then supported upon the angled sections so as to form shelving units across the width of the vehicle and in connection with both the angled pieces on the left and the right side frames. Finally cross bracing pieces 2 may be used to further support the side frames. Such cross bracing may run at angles to the vertical 4 and horizontal pieces 16, 15 of the side frames.

Each side unit is composed of as series of vertical and horizontal pieces that are connected to one another. It is preferred that the pieces be made of steel or similar sturdy materials such as metals. Thus each section forms a grid of such vertical members and there is a left and right section for each cargo vehicle (Grid best seen in FIG. 2).

Each of the vertical units 4 in the side section has two series of holes 20 running vertically down that unit. The holes are spaced apart at fixed intervals so that there is a pair of holes at every elevation.

The series of holes should be spaced at regular intervals so that the user knows by experience what height he is setting by counting down a number of holes. The holes should run the entire vertical distance from top to bottom. In this manner any pair of such holes can be chosen to be the preferred height for the support item that goes there, be it upright pocket or angled piece.

The holes in the vertical pieces function as bolt holes so that a hollow piece called a stud can be secured to the side section by a bolt placed through the hollow and a nut holding the bolt on the other side of the side section. Thus studs can be set at any one of many intervals of vertical elevation in order to provide for shelves and load bars that can be adjusted in height. Studs can be placed both above and below the angle shaped section 16 and in addition, a bolt and nut can be placed through one of the holes 20 and through a hole in the angle section in order to further secure the angle shaped section.

The horizontal sections of the side section may be no more than flat stock and are simply welded to the vertical sections in order form the rigid framework of the side frames. Angle clips 22 (FIGS. 6 and 7) are smaller angle shaped pieces of metal w/ bolt holes that are used to secure the bottom of each side section to the floor of the vehicle by means of bolts that extend through the floor of the vehicle and are also attached to the bottom portions of the side section.

The angle shaped pieces are used to support the sides of each of the shelf units in the system. These angle shaped pieces are "L" shaped and the lower part of the "L" is used to support the bottom portion of each of the shelves. It is preferred that the angle pieces be 3" by 3" in dimension and probably be about 3/16" in thickness. The units may be made of steel or other types of metals commonly available for such purposes.

Planking 14 used to form the shelves may be in the form of 2" by 12" wood planks that may be of variable length to accommodate the width of the trailer. It should rest upon each of the angle sections 16 and will form the necessary lateral support for the merchandise.

The pockets 15 (detail shown in FIG. 5) are preferably formed of steel or other metal and roughly resemble a "U" shaped channel with the open part of the "U" facing upward. Thus the load bar can be dropped into the pockets in the top of each side section and then be adjusted until the load bars provide lateral pressure against the sides of the pockets. The pockets are of course attached by means of the studs and bolts through the bolt holes in the vertical sections of the side sections. There are holes 24 in the pockets to facilitate this. The height should be appropriately chosen, but usually there will be one load bar at the top of the vertical section and one near the bottom of the vertical section. See FIG. 3.

The load bars as described are installed at the top of each side rack 12. There should be one upright pocket in the top of a vertical section. A given load bar will then connect preferably both the top and bottom sections of corresponding left and right vertical supports or side racks 12. As noted above, the actual position of the pocket and hence, the load bars can be varied to accommodate varying conditions. Thus two horizontal load bars are preferably in connection with each vertical section of the side frame.

In this way, the load support bars provide lateral stability to the system with horizontal and vertical stability provided by the vertical and horizontal frame units. Further stability is created by the use of cross bracing 2 that connects portions of the side frame sections to one another.

The load bar effective length can be adjusted incrementally by means of a ratcheting device in connection the bars that comprise the load bar. (i.e. there are typically two telescoping bars that slide vis a vis one another that constitute the load bar). The ratcheting device allows the bar to be extended to a certain length and then set at that distance. Of course the load bar can be decreased in length by means of the same ratchet device should the need arise to remove the bar.

The load bar allows pressure to be exerted by the load bars against the side wall sections to be selectively increased as needed so as to exert maximum lateral force upon the side sections of the system. The user can determine this force by trial and error until he determines that a stable amount of force is being exerted by the load bar laterally upon each of the side sections of the system.

It is preferred that the cross bracing sections be made of square cross sectioned metal units with dimensions that may vary as needed to accommodate the needs of the system and its application.

In the fixed in place system, the same types of structural components are used and they may be welded in place by any state of the art methods. Such as the load bars may be welded onto the pockets, the angle pieces may be welded upon the shelves and the cross bracing may be welded upon the side frame sections. The vertical and horizontal sections may be routinely welded to another in both the permanent, welded version and the adjustable non welded version of the system. The center upright supports are optional depending upon the length of the particular shelf unit. In the case of 2' to 6' sections it is not believed that a center support would be needed in most such case. However, in the case of 8' and longer width shelving units, it is believed recommended that a center support be used with this shelving system. For example, the central located vertical member 4, in FIG. 2 may serve for this purpose.

The term "cargo vehicle" is meant to include vans, trucks, and other motorized transport systems.

I claim:

1. A racking system for vehicles, the vehicles having a ceiling and a floor for the attachment of the racking system, said system comprising: left and right side support structures having means to support a series of lateral support surfaces in connection with each of said left and right side support structures, lateral support surfaces in connection with said left and right side support structures, a load bar comprising a pair of sliding rods in telescoping relationship with one another so that one of said rods will slide within the other of said rods, said load bar having a ratchet means to extend the effective length of said sliding bars and to fix said bars at said effective length from another, each of said left and right side support structures having a top and a bottom pocket of size and shape adapted to fit the ends of a load bar, said top pocket in connection with the top of each of said left and right support structures so that said pocket is above said lateral support surfaces when said racking system is in place, said bottom pocket in connection with the bottom of each of said left and right support structures so that said pocket is below said lateral support surfaces when said racking system is in place; angle clip members in connection with a top and bottom of each said side support structure, each of said angle clip members comprising a piece of metal having an approximately 90° angle in said metal so as to create a pair of flanges separated by said angle, each of said flanges having holes for joining said left and right side supports to said ceiling and said floor of said vehicle.

2. The apparatus of claim 1 including an adjustable means for varying the height of said lateral support surfaces, said means comprising a series of adjustment holes in said left and right side support structures, said adjustment holes being separated from one another by regular predetermined intervals, and corresponding attachment means in said lateral support surfaces, said corresponding attachment means being sized and shaped for attachment to said adjustment holes.

* * * * *